US012668294B2

(12) United States Patent
Muramatsu et al.

(10) Patent No.: US 12,668,294 B2
(45) Date of Patent: Jun. 30, 2026

(54) STEERING DEVICE

(71) Applicant: TOYODA GOSEI CO., LTD., Kiyosu (JP)

(72) Inventors: Kazuma Muramatsu, Kiyosu (JP); Akitoshi Naganawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/060,110

(22) Filed: Feb. 21, 2025

(65) Prior Publication Data

US 2025/0304143 A1 Oct. 2, 2025

(30) Foreign Application Priority Data

Mar. 28, 2024 (JP) ................................. 2024-054003

(51) Int. Cl.
    *B62D 1/04* (2006.01)
    *B60K 35/22* (2024.01)
    *B60Q 3/283* (2017.01)
(52) U.S. Cl.
    CPC ............... *B62D 1/04* (2013.01); *B60K 35/22* (2024.01); *B60Q 3/283* (2017.02); *B60K 2360/782* (2024.01)
(58) Field of Classification Search
    CPC .................................................... B60Q 3/283
    See application file for complete search history.

(56) References Cited

U.S. PATENT DOCUMENTS

| | | | | |
|---|---|---|---|---|
| 11,312,294 | B1* | 4/2022 | Matsu ..................... | B62D 1/06 |
| 2020/0001782 | A1* | 1/2020 | Kamei ..................... | B60Q 3/64 |
| 2021/0206317 | A1* | 7/2021 | Marc ..................... | B60K 35/60 |
| 2021/0221285 | A1* | 7/2021 | Kihara ..................... | B60Q 3/62 |
| 2022/0063699 | A1* | 3/2022 | Kojima .................. | B60Q 3/283 |
| 2022/0315090 | A1* | 10/2022 | Kojima .................. | B60K 35/22 |
| 2023/0242180 | A1* | 8/2023 | Kojima .................. | B62D 1/04 |
| | | | | 362/511 |
| 2024/0199108 | A1* | 6/2024 | Miyata ..................... | B62D 1/04 |

FOREIGN PATENT DOCUMENTS

JP          2021-113040 A          8/2021

* cited by examiner

*Primary Examiner* — Daniel D Yabut
(74) *Attorney, Agent, or Firm* — Posz Law Group, PLC

(57) ABSTRACT

A steering device includes a grip portion and a display device capable of emitting visible light during operation. The display device is disposed at a predetermined position visually recognizable by the driver in the grip portion. The grip portion includes a core material disposed at the center, a covering layer covering a periphery of the core material, and a sheet-like skin layer covering an outer periphery of the covering layer. The display device is disposed in an upper face side region that is close to a driver in the grip portion, is configured to be able to emit visible light upward, and is covered with the skin layer at an outer periphery together with the covering layer around the outer periphery. The skin layer is made of a base material that is opaque and has translucency.

4 Claims, 8 Drawing Sheets

UP

FRONT ←→ REAR

DOWN

FIG. 6

STEERING DEVICE

CROSS REFERENCE TO RERATED APPLICATION

The present application claims priority from Japanese Patent Application No. 2024-054003 of Muramatsu et al., filed on Mar. 28, 2024, the entire disclosures of which are incorporated herein by reference.

BACKGROUND

1. Technical Field

The present disclosure relates to a steering device having a grip portion gripped at the time of rotational steering, and having a configuration in which a display device is disposed at a predetermined position in the grip portion, the predetermined position being visually recognizable by a driver.

2. Description of Related Art

In the related art, as a steering device in which a display device is disposed at a grip portion, there has been a steering device having a configuration described in JP 2021-113040 A. In this conventional steering device, a light bar as a display device is disposed on an upper face of a ring portion as a grip portion, the upper face being close to a driver. More specifically, in the conventional steering device, the light bar includes a visible light source that is turned on and emits visible light, and a light guide that diffuses the visible light emitted from the visible light source, and is configured to emit the visible light upward toward the driver from the upper end of the light guide.

However, in the conventional steering device, the light bar includes a cover that covers the outer periphery (upper side) of the light guide, and the cover is made of a synthetic resin. In a conventional steering device, a skin layer made of synthetic leather, artificial leather, natural leather, or the like is disposed at an outer surface of a portion excluding a light bar in a grip portion. That is, in the conventional steering device, when the grip portion is gripped, the synthetic resin cover constituting the light bar and the skin layer touch the palm in the arrangement region of the light bar. Therefore, the tactile sense when gripping the arrangement region of the light bar is not good, and there is room for improvement.

SUMMARY

A steering device of the present disclosure includes a grip portion to be gripped at a time of rotational steering, and a display device, the display device being disposed at a predetermined position in the grip portion, the predetermined position being visually recognizable by a driver, the display device being capable of emitting visible light during an operation, the grip portion having a substantially circular cross section includes a core material disposed at a center, a covering layer covering a periphery of the core material, and a sheet-like skin layer covering an outer periphery of the covering layer, wherein the display device is disposed in an upper face side region of the grip portion, the upper face side region being close to the driver, is configured to be able to emit the visible light upward, and is covered with the skin layer at an outer periphery together with the covering layer, the skin layer is made of a base material that is opaque and has translucency.

BRIEF DESCRIPTION OF THE DRAWINGS

FIG. 6 is a enlarged partially plan view schematically illustrating a state when a visible light LED is turned on in the steering wheel according to the embodiment;

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
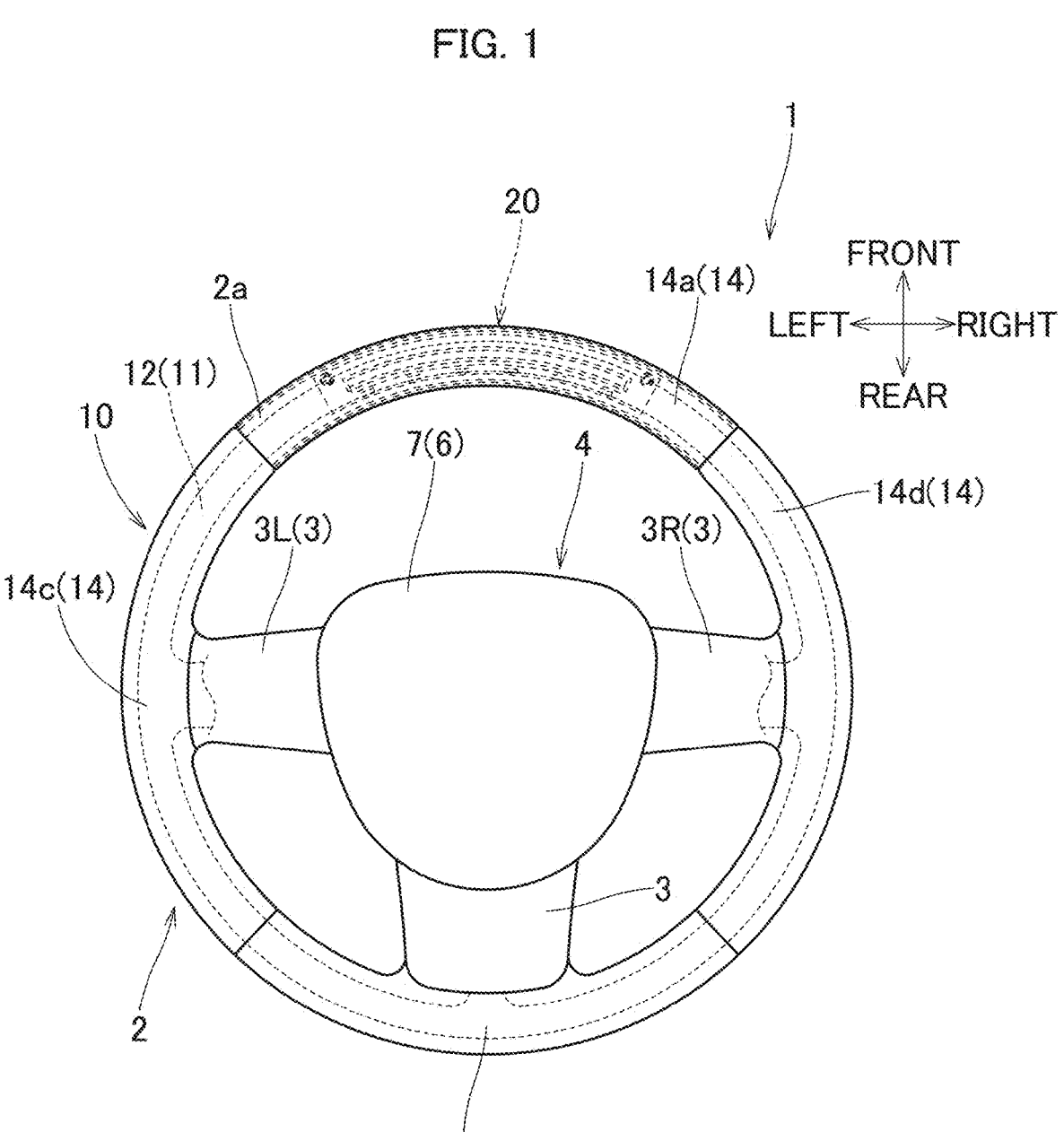
FIG. 1 is a plan view of a steering device (steering wheel) according to an embodiment of the present disclosure.

Hereinafter, an embodiment of the present disclosure will be described with reference to the drawings. As illustrated in FIG. 1, a steering device 1 (steering wheel) according to the embodiment includes an annular ring portion 2 serving as a grip portion gripped at the time of rotational steering; a boss portion 4 disposed substantially at the center of the ring portion 2; a plurality of (three in the case of the embodiment) spoke portions 3 connecting the ring portion 2 and the boss portion 4. Further, the steering wheel 1 includes, as components, an airbag device 6 in an upper portion of the boss portion 4; a light bar 20 as a display device disposed in the ring portion 2; and a steering wheel body (steering device body) 10.

In the present specification, the front-rear, up-down, and left-right directions will be described based on the straight advancing steering state of the steering wheel 1 mounted on the vehicle unless otherwise specified. Specifically, a direction along the rotation center axis of the ring portion 2 is defined as an up-down direction, a direction orthogonal to the rotation center axis of the ring portion 2 and along the front-rear direction of the vehicle is defined as a front-rear direction, and a direction orthogonal to the rotation center axis of the ring portion 2 and along the left-right direction of the vehicle is defined as a left-right direction.

The airbag device 6 disposed at the upper portion of the boss portion 4 includes an airbag (not illustrated) that is folded and stored, an inflator (not illustrated) that supplies an inflation gas to the airbag, and a pad 7 that covers the upper face of the folded airbag. As illustrated in FIG. 1, the pad 7 is disposed so as to entirely cover the upper face of the boss portion 4.

Figure 3:
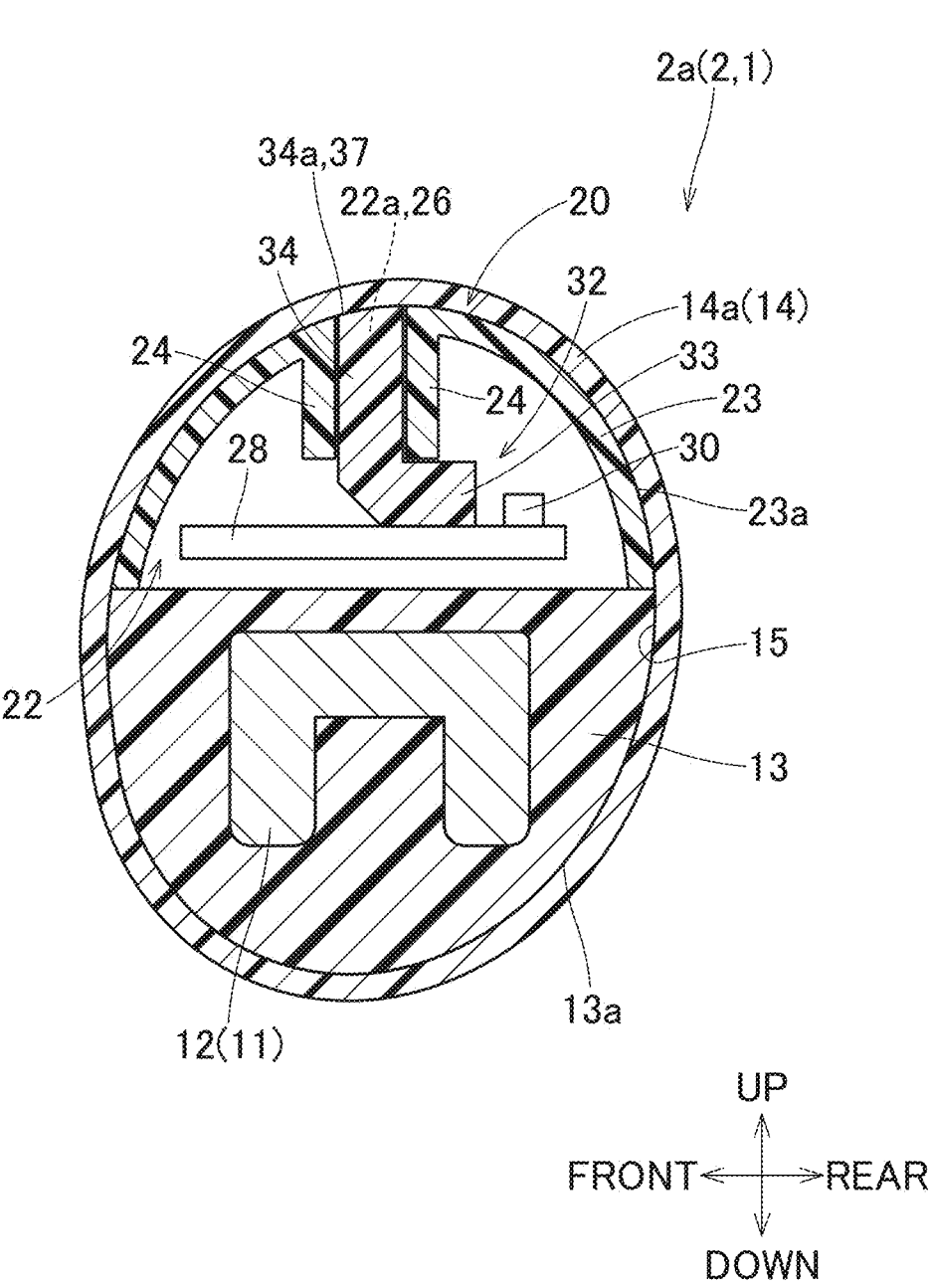
FIG. 3 is a cross-sectional view of the steering wheel according to the embodiment, and corresponds to a portion III-III in FIG. 2.
Figure 4:
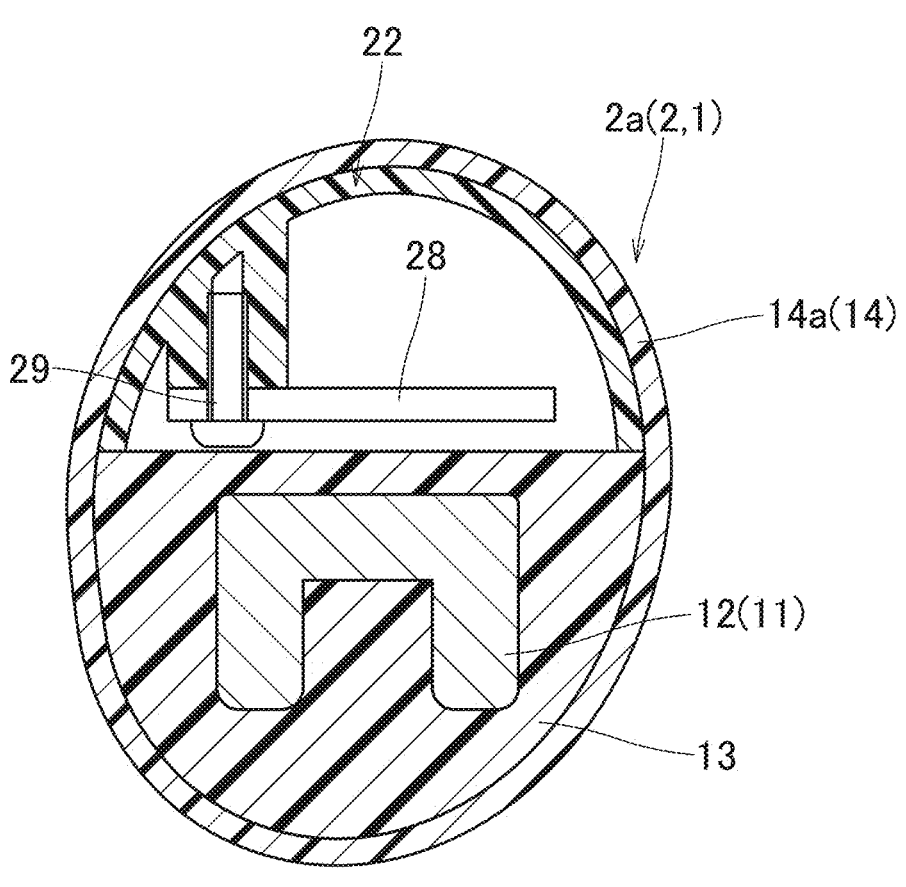
FIG. 4 is a cross-sectional view of the steering wheel according to the embodiment and corresponds to a portion IV-IV in FIG. 2.
Figure 4:
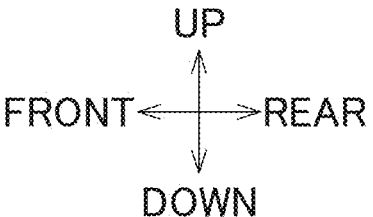

As illustrated in FIGS. 1, 3, and 4, the steering wheel body 10 includes a core metal 11 as a core material disposed so as to connect the ring portion 2, the boss portion 4, and the spoke portions 3 to each other; a covering layer 13 covering an outer periphery of a portion of the core metal 11 in the ring portion 2 and the spoke portions 3; a skin layer 14 covering an outer periphery of the covering layer 13; and a lower cover (not illustrated) that covers a lower face of the boss portion 4. The ring portion 2 as a grip portion has a substantially circular cross section (specifically, the cross section has a substantially elliptical shape). The ring portion 2 includes a ring portion core metal 12 to be described later as a core material disposed at the center, the covering layer 13 covering the outer periphery of the ring portion core metal 12, and the sheet-like skin layer 14 covering the outer periphery of the covering layer 13 (see FIGS. 3 and 4).

The core metal 11 is made of metal such as an aluminum alloy or the like. In the core metal 11, the ring portion core metal 12 disposed at the portion of the ring portion 2 has a substantially inverted U-shaped cross section (see FIGS. 3 and 4).

The covering layer 13 is made of a soft synthetic resin having a cushioning property, and is made of a soft foam material such as foamed polyurethane in the case of the embodiment. The covering layer 13 is configured to cover the outer periphery of the ring portion core metal 12 at the portion of the ring portion 2, and has a substantially elliptical cross-sectional shape. In addition, the covering layer 13 is disposed in a region of about a lower half of the ring portion 2 in a region where the light bar 20 as a display device is disposed (see FIGS. 3 and 4).

The skin layer 14 is disposed so as to cover the outer peripheral face 13a of the covering layer 13 including the arrangement region of the light bar 20 (see FIGS. 3 and 4). In the embodiment, the skin layer 14 is made of a synthetic resin sheet body or leather such as synthetic leather or artificial leather. In the embodiment, the skin layer 14 is divided into a plurality of portions along the circumferential direction of the ring portion 2. Specifically, the skin layer 14 is divided into four parts of front, back, left, and right (see FIG. 1). In the steering wheel 1 of the embodiment, in the skin layer 14, the front portion 14a disposed at the arrangement region of the light bar 20 is made of a base material that is opaque and has translucency. Specifically, in the embodiment, a general portion (left portion 14c, right portion 14d, and rear portion 14b) other than the front portion 14a is made of synthetic leather colored in gray. The front portion 14a is colored in gray and opaque, which is the color substantially same as that of the left portion 14c, the right portion 14d, and the rear portion 14b, and is made of synthetic leather having translucency. At the arrangement position of the light bar 20, the skin layer 14 (front portion 14a) is disposed so as to cover the entire circumference including the light bar 20 at the outer peripheral face of the cross section of the ring portion 2 (see FIGS. 3 and 4).

Figure 2:
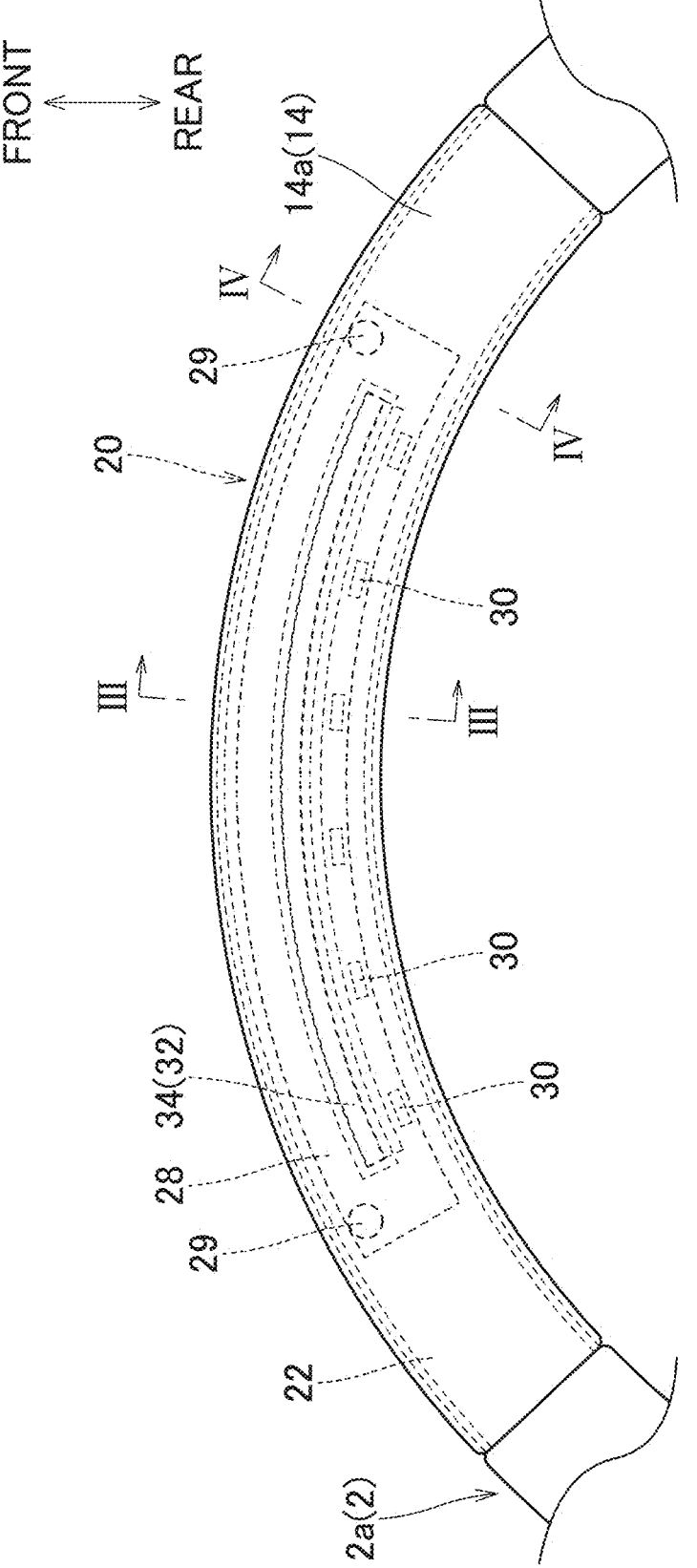
FIG. 2 is a partially enlarged plan view illustrating an arrangement portion of a light bar as a display device in the steering wheel according to the embodiment.

The light bar 20 as a display device is disposed at a predetermined position visible from a driver (not illustrated) at the steering wheel 1. In the embodiment, as illustrated in FIGS. 1 and 2, the light bar 20 is disposed at the upper face of the front portion 2a between the left and right spoke portions 3L and 3R in the ring portion 2 gripped by the driver during steering. The light bar 20 is curved such that the longitudinal direction is substantially along the circumferential direction of the ring portion 2. Specifically, the light bar 20 is formed continuously in a region of about ¼ of the ring portion 2 as a substantially band shape in which the outer shape when viewed from the upper side is curved so that the longitudinal direction is substantially along the circumferential direction of the ring portion 2. The light bar 20 is disposed such that the center in the longitudinal direction substantially coincides with the front end of the ring portion 2.

As illustrated in FIGS. 2 to 4, the light bar 20 includes a substrate 28; a plurality of visible light sources (visible light LEDS 30) attached so as to be disposed in parallel substantially along the longitudinal direction of the substrate 28; a light guide 32; and a holding member 22 that holds the light guide 32.

As illustrated in FIG. 2, the holding member 22 is disposed over substantially the entire region of the arrangement region of the light bar 20. The holding member 22 holds the light guide 32 in a central region in the longitudinal direction. The holding member 22 is made of a non-translucent material, and is made of a black synthetic resin (specifically, a black ABS resin, a mixture of a polycarbonate resin and an ABS resin, or the like) in the embodiment. The holding member 22 constitutes an upper region in the front portion 2a of the ring portion 2. As illustrated in FIG. 3, the holding member 22 includes a peripheral wall portion 23 formed to be curved so that the outer surface (outer peripheral face 23a) is continuous with the outer surface (outer peripheral face 13a) of the covering layer 13; and a support wall portion 24 that is formed to extend downward from a region at an upper end of the peripheral wall portion 23 and is capable of supporting an outer periphery (front, rear, left, and right) of the light guide 32. The holding member 22 has an opening 22a through which the light guide 32 can be inserted at the upper end of the peripheral wall portion 23. The opening 22a constitutes a radiation opening 26 through which visible light VL radiated when the visible light LED 30 is turned on can be radiated upward. The holding member 22 covers the entire upper part of the front portion 2a of the ring portion 2 except for the radiation opening 26. That is, the holding member 22 is configured to cover the periphery of the light guide 32 except for a light emitting face 37 to be described later. As illustrated in FIG. 3, the support wall portion 24 is disposed so as to cover the front side and the rear side of the opening side portion 34 over substantially the entire upper and lower regions in the front and rear region of an opening side portion 34 described later in the light guide 32.

The substrate 28 is disposed substantially along the front-rear direction. In addition, the substrate 28 has a substantially belt-like shape curved along the longitudinal direction so as to be substantially along the curved shape of the ring portion 2 when viewed in the up-down direction (see FIGS. 2 to 4). In the case of the embodiment, as illustrated in FIG. 2, the substrate 28 is disposed in a region excluding the left and right ends of the arrangement region of the light bar 20 (holding member 22). As illustrated in FIGS. 2 and 4, the substrate 28 is disposed such that both left and right ends are attached to the holding member 22 using screws 29 and a gap is provided between the substrate 28 and the upper face of the covering layer 13 disposed below the substrate 28.

As the visible light source, in the embodiment, the visible light LED 30 capable of emitting light of a predetermined color is used. The plurality of visible light LEDS is disposed in parallel along the 30 longitudinal direction in a region near the rear end of the substrate 28 on the upper face. In the embodiment, six visible light LEDs 30 are interspersed over substantially the entire region of the substrate 28 in the longitudinal direction (see FIG. 2). Each of the visible light LEDs 30 is attached so as to emit the visible light VL in a forward direction (outward) that is close to the light guide 32. Operation of each visible light LED 30 is controlled by an operation circuit (not illustrated).

Figure 5:
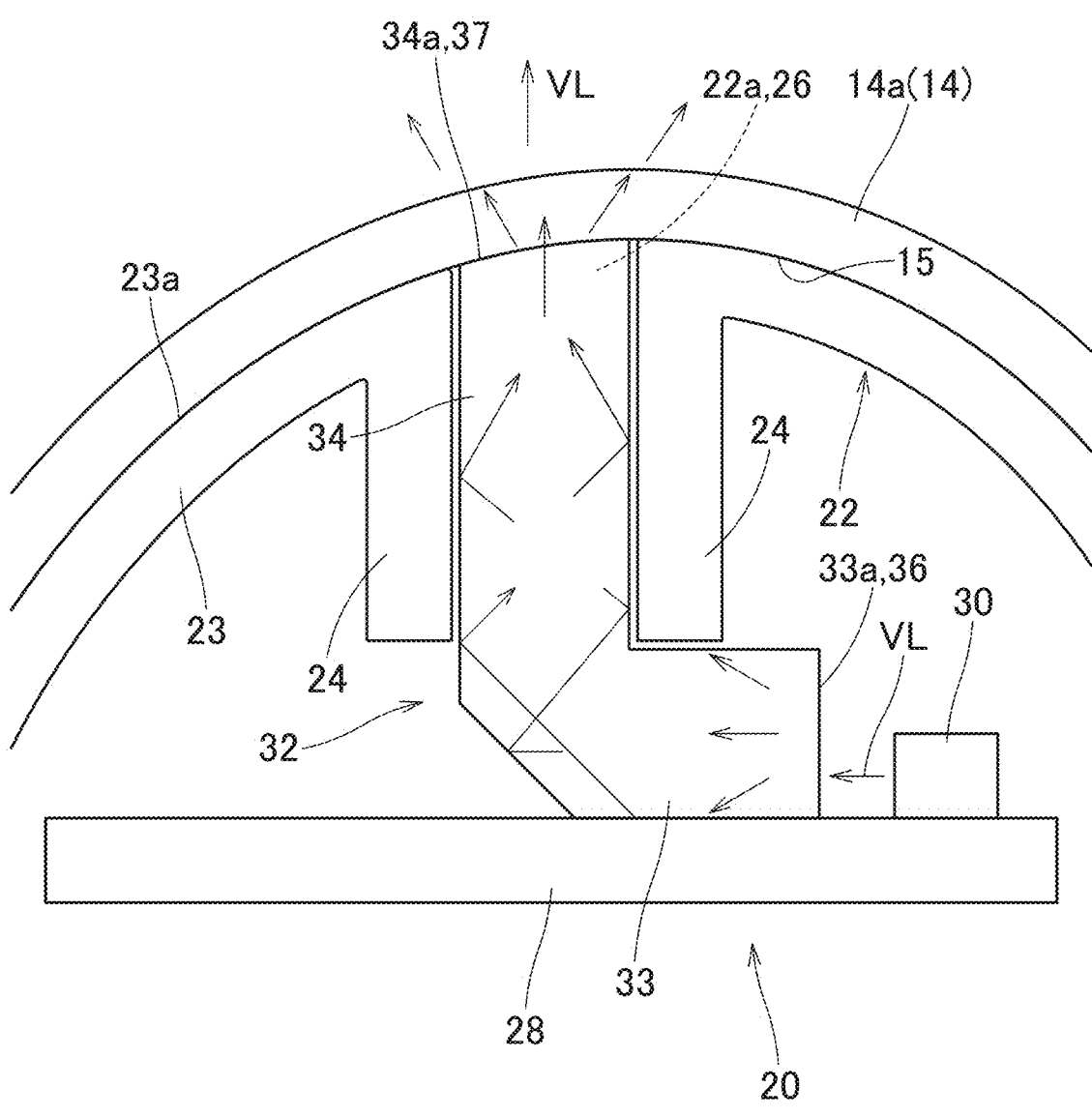
FIG. 5 is a partially enlarged schematic view illustrating the vicinity of a light guide in the steering wheel of the embodiment, and is a view for describing a state of diffusion of visible light.

The light guide 32 is disposed in a region excluding the left and right ends of the holding member 22. In other words, the light guide 32 is disposed in a region equivalent to the substrate 28. As illustrated in FIG. 2, the light guide 32 is curved in a substantially arc shape so as to be substantially along the curved shape of the ring portion 2 when viewed in the up-down direction. The light guide 32 is made of a synthetic resin such as a polycarbonate resin or an acrylic resin. The light guide 32 is disposed in front of the visible light LED 30 on the upper face of the substrate 28. Specifically, the light guide 32 is bent so as to extend upward while extending forward from the front side of the visible light LED 30, and has a plate shape with a substantially L-shaped cross section (see FIG. 3). Specifically, the light guide 32 includes a light source side portion 33 disposed in front of the visible light LED 30 and the opening side portion 34 disposed so as to extend upward from the front end of the light source side portion 33. A rear end face 33a (visible light LED 30 side face) of the light source side portion 33 is an incident face 36 that visible light emitted from the visible light LED 30 enters. An upper end face 34a of the opening side portion 34 is the light emitting face 37 that emits the visible light incident on the incident face 36 upward (see FIG. 5). That is, the light guide 32 is configured to have a substantially L-shaped cross-sectional shape so that the incident face 36 is disposed at the lower end and the region at the lower end (light source side portion 33) protrudes toward the visible light LED 30. In the steering wheel 1 of the embodiment, the upper end face 34a (the light emitting face 37) of the opening side portion 34 of the light guide 32 is formed so as to be continuous with an outer peripheral face 23a of the peripheral wall portion 23 of the holding member 22 (that is, continuous from an outer peripheral face 13a of the covering layer 13) in the cross section of the ring portion 2 as illustrated in FIGS. 3 and 5. The upper end face 34a (light emitting face 37) of the opening side portion 34 is formed to be slightly curved upward. In the steering wheel 1 of the embodiment, the outer peripheral face 23a of the peripheral wall portion 23 of the holding member 22 and the light emitting face 37 of the light guide 32 are in contact with an inner peripheral face 15 of the skin layer 14 (front portion 14a) (see FIGS. 3 and 5). That is, in the steering wheel 1 of the embodiment, in the cross section of the ring portion 2, the light bar 20 and the surrounding covering layer 13 are covered with the same skin layer 14 (front portion 14a) over the entire outer periphery with substantially no gap.

Figure 6:
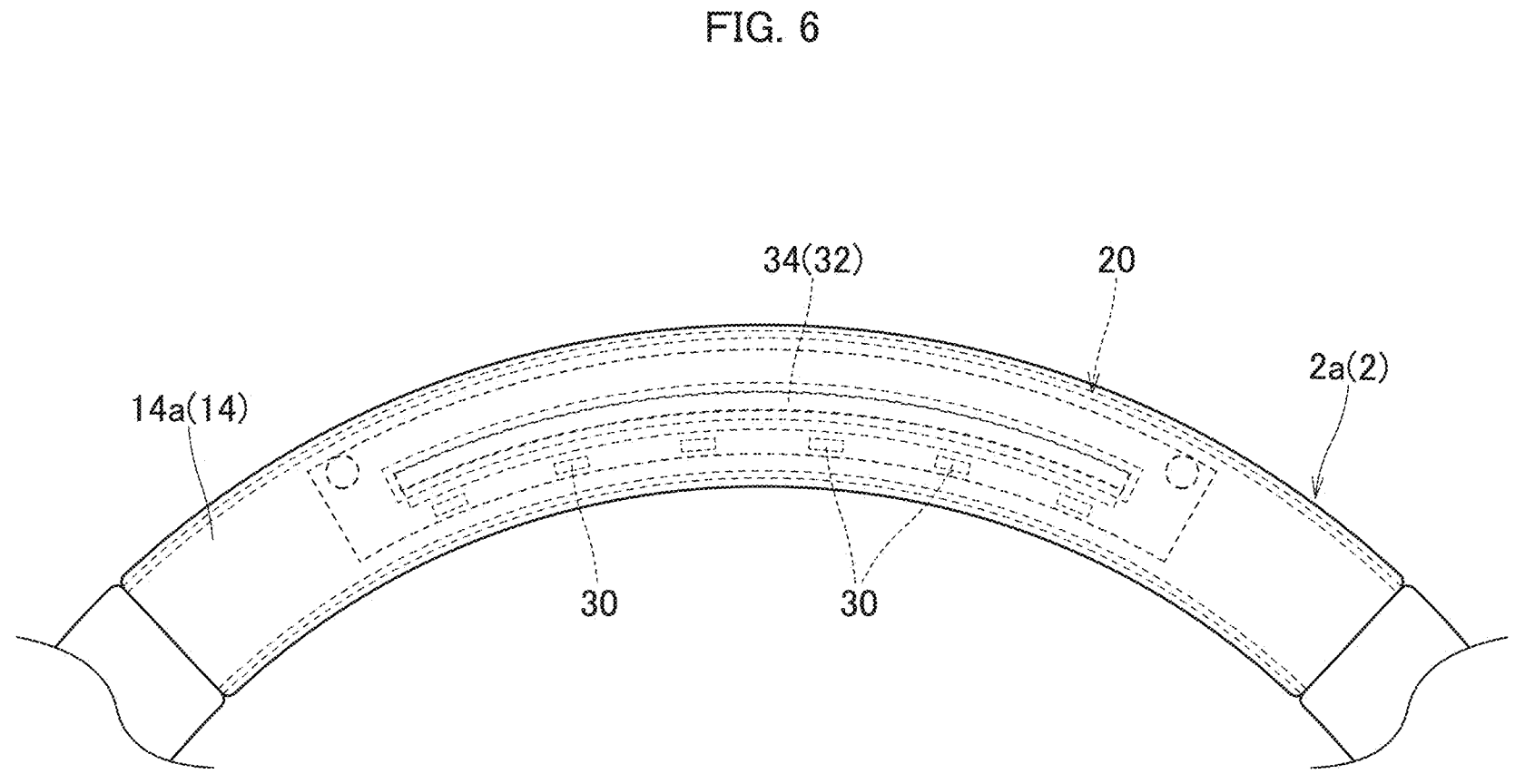

In the steering wheel 1 of the embodiment, the light bar 20 as a display device is attached to the ring portion 2 as follows. First, the substrate 28 to which the visible light LED 30 and the light guide 32 are attached is attached to the holding member 22 using the screws 29. The substrate 28 and the holding member 22 are placed at the upper face of the covering layer 13. Thereafter, when the skin layer 14 (front portion 14a) is disposed so as to cover the outer peripheral face 13a of the covering layer 13 and the outer peripheral face (the outer peripheral face 23a of the peripheral wall portion 23 of the holding member 22 and the light emitting face 37 of the light guide 32) of the light bar 20, the light bar 20 can be attached to the ring portion 2. In the steering wheel 1 of the embodiment, for example, the light bar 20 is operated to turn on the visible light LED 30 by receiving an operation signal from an operation circuit (not illustrated) at the time of calling the driver's attention or the like. When the visible light LED 30 is turned on, the visible light VL emitted from the visible light LED 30 enters the light guide 32 from the incident face 36, is diffused in the light guide 32, and is emitted from the light emitting face 37 on the upper end side as illustrated in FIG. 5. As illustrated in FIG. 6, the entire region of the upper face of the light guide 32 is illuminated when the steering wheel 1 is viewed from above (in FIG. 6, the illuminated state is displayed in a shaded manner.).

In the steering wheel 1 of the embodiment, the light bar 20 as the display device is disposed in the upper face side region of the ring portion 2 as the grip portion, the upper face being close to the driver, but the outer periphery of the light bar 20 together with the covering layer 13 around the outer periphery is covered with the skin layer 14 (front portion 14a). That is, in the steering wheel 1 of the embodiment, the light bar 20 is not exposed to the outside, and the outer periphery of the ring portion 2 is covered with the skin layer 14 (front portion 14a) even in the arrangement region of the light bar 20. Therefore, even when the arrangement region of the light bar 20 is gripped at the time of driving, only the skin layer 14 (front portion 14a) comes into contact with the palm, and the tactile sense at the time of gripping the arrangement region of the light bar 20 is favorable. In the steering wheel 1 of the embodiment, in the skin layer 14, the front portion 14a disposed in the arrangement region of the light bar 20 is made of a base material (in the case of the embodiment, synthetic leather having translucency) that is opaque and has translucency. Therefore, when the light bar 20 is operated (in the case of the embodiment, when the visible light LED 30 as a visible light source is turned on), the visible light VL emitted upward can be transmitted, and the operating state (the lighting state of the visible light LED 30, that is, the light emission state of the light guide 32) of the light bar 20 can be stably visually recognized. Furthermore, when the light bar 20 is not in operation, the light bar 20 is not visible from the outside, and thus the design is also good.

Therefore, even when the steering wheel 1 of the embodiment is configured to illuminate a predetermined portion at the time of operation, it is possible to make a tactile sense at the time of gripping favorable and to steer comfortably.

In the steering wheel 1 of the embodiment, the outer periphery of the light bar 20 is covered with the skin layer 14. Therefore, the surface of the light guide 32 need not be covered with the cover portion conventionally used, and the outer periphery of the outer peripheral face of the holding member 22 holding the light guide 32 (the outer peripheral face 23a of the peripheral wall portion 23) and the light emitting face 37 constituted by the portion of the light guide 32 at the upper end is directly covered with the skin layer 14 (front portion 14a). As a result, it is not necessary to dispose a cover that covers the light guide used in the conventional steering device, and it is possible to suppress an increase in the number of components and to provide a simple configuration. In the steering wheel 1 of the embodiment, the light emitting face 37 of the light guide 32 and the outer peripheral face of the holding member 22 (the outer peripheral face 23a of the peripheral wall portion 23) are formed so as to be continuous from the outer peripheral face 13a of the covering layer 13. Therefore, even when an arrangement region of the light bar 20, a boundary portion between the light bar 20 and the covering layer 13, and the like are touched by the driver's hand when the ring portion 2 is gripped, a smooth tactile sense can be obtained, and the tactile sense is good. Further, in the steering wheel 1 of the embodiment, the light guide 32 (specifically, the opening side portion 34 of the light guide 32) can be lengthened as compared with the case where the cover is disposed. Therefore, the visible light VL can be more widely diffused in the light guide 32 (opening side portion 34), and the entire region of the upper face of the light guide 32 can be substantially uniformly illuminated while the occurrence of unevenness is suppressed.

Specifically, in the steering wheel 1 of the embodiment, the light guide 32 is configured such that the incident face 36 on which the visible light VL emitted from the visible light LED 30 is incident is disposed at the lower end, and the cross-sectional shape is substantially L-shaped such that the region at the lower end (light source side portion 33) including the incident face 36 is protruded toward the visible light LED 30. Therefore, a long distance (optical path) from the incident face 36 to the light emitting face 37 of the light guide 32 can be secured, and the visible light can be more widely diffused in the light guide 32. As a result, the number of visible light LEDs can be reduced, and the entire arrangement region of the light guide 32 can be uniformly illuminated while the occurrence of unevenness is suppressed.

Figure 7:
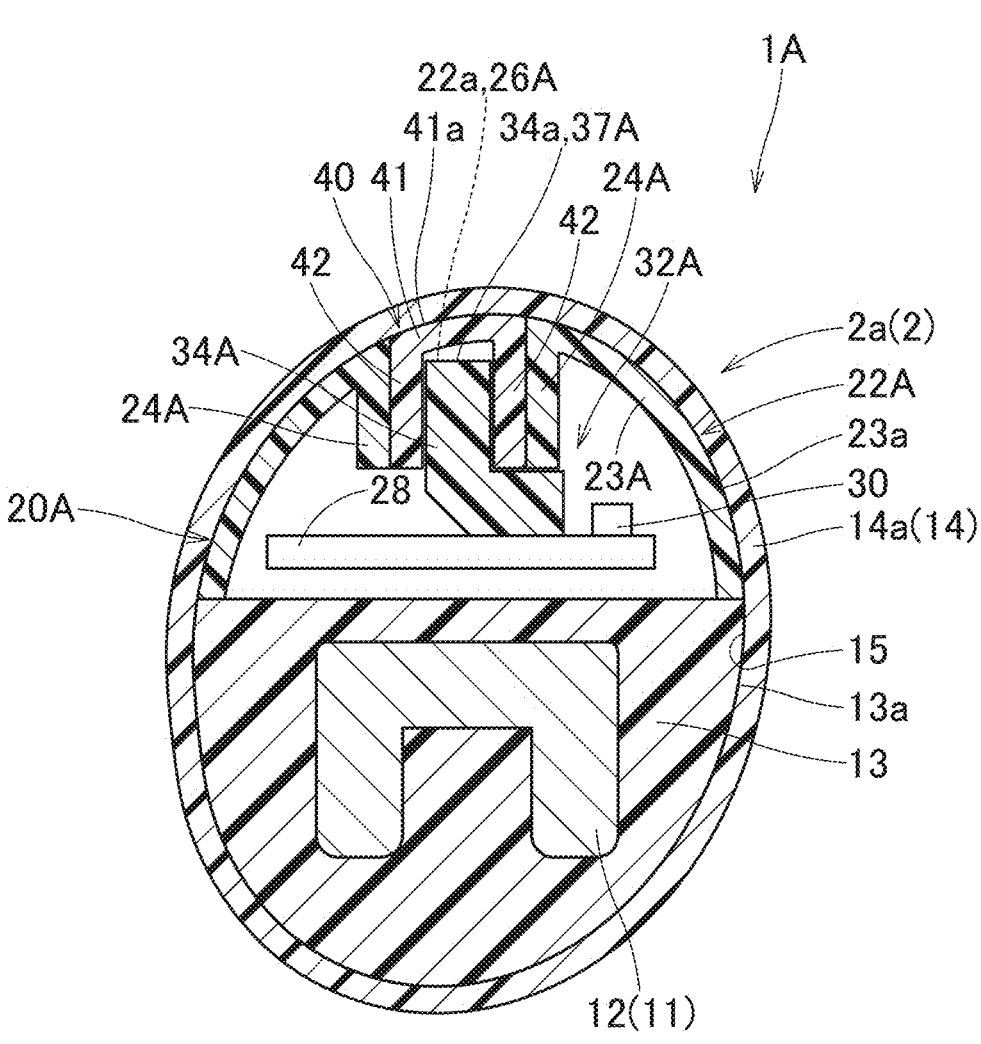
FIG. 7 is a cross-sectional view of a portion of a ring portion in a steering wheel according to another embodiment of the present disclosure.
Figure 8:
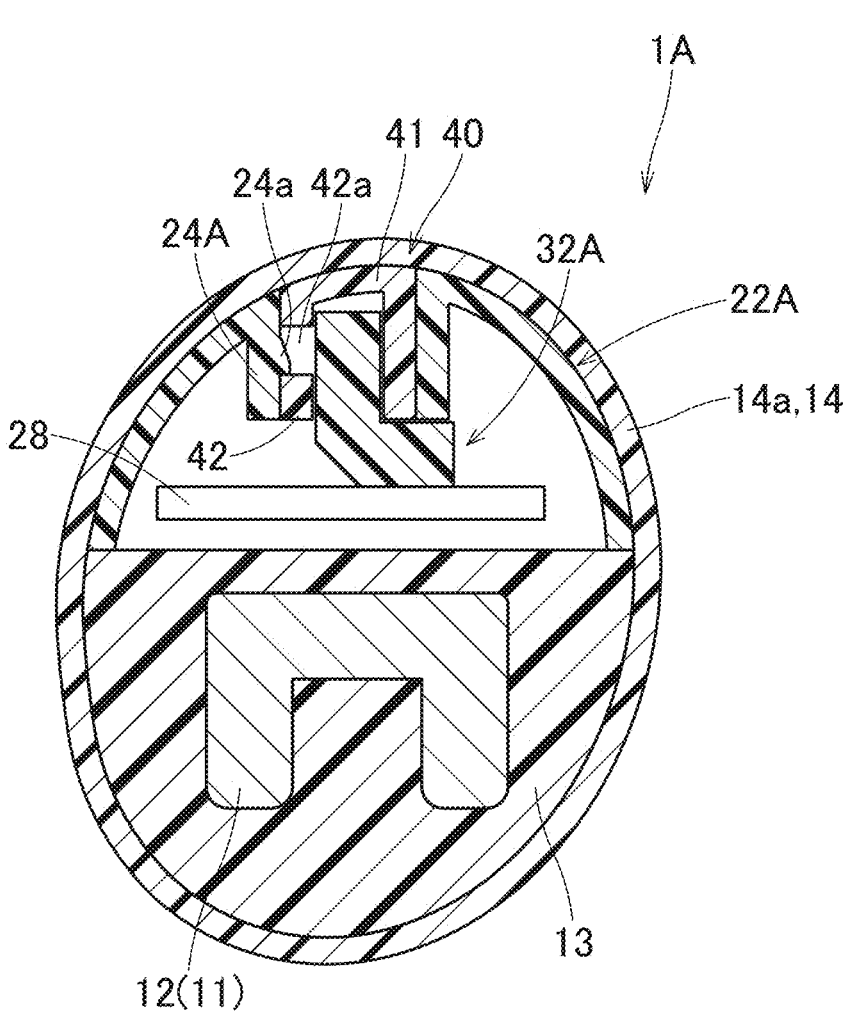
FIG. 8 is a cross-sectional view of another portion of the ring portion in the steering wheel of FIG. 7.

As illustrated in FIGS. 7 and 8, a steering wheel 1A may include a light bar 20A configured to cover the upper face of a light guide 32A with a cover portion 40. In the steering wheel 1A, members other than the light bar 20A have the same configuration as those of the steering wheel 1 described above. Therefore, in the steering wheel 1A, the same members as those of the steering wheel 1 are denoted by the same reference numerals, and a detailed description thereof will be omitted.

As illustrated in FIGS. 7 and 8, the light bar 20A includes the substrate 28; a plurality of visible light LEDS 30 attached so as to be disposed in parallel substantially along the longitudinal direction of the substrate 28; the light guide 32A; the cover portion 40 covering an upper portion of the light guide 32A; and a holding member 22A that holds the light guide 32A and the cover portion 40. The substrate 28 and the visible light LED 30 have the same configuration as the substrate 28 and the visible light LED 30 in the above-described light bar 20, and thus, are denoted by the same reference numerals, and a detailed description thereof is omitted.

As in the holding member 22 described above, the holding member 22A includes a peripheral wall portion 23A formed to be curved so that the outer surface (outer peripheral face 23a) is continuous with the outer surface (outer peripheral face 13a) of the covering layer 13 in the cross section of the ring portion 2; and a support wall portion 24A that is formed to extend downward from the upper end side region of the peripheral wall portion 23A and is capable of supporting the outer periphery (front, rear, left, and right) of the light guide 32A and the cover portion 40. In the holding member 22A, the opening 22a through which the cover portion 40 is inserted is formed at the upper end of the peripheral wall portion 23A. The opening 22a constitutes a radiation opening 26A. The holding member 22A is configured to cover the entire upper part of the front portion 2a of the ring portion 2 except for the radiation opening 26A. The support wall portion 24A is in contact with a side wall portion 42 described later of the cover portion 40 to support the cover portion 40 and the light guide 32A disposed between the side wall portions 42 of the cover portion 40. A locking claw portion 24a is disposed at a portion of the support wall portion 24A, the portion being disposed in front of the cover portion 40 (see FIG. 8). The locking claw can be inserted and locked into a locking hole 42a formed in the side wall portion 42. The locking claw portion 24a is formed so as to protrude rearward. Although not illustrated in detail, a plurality of locking claw portions 24a is disposed along the longitudinal direction of the support wall portion 24A (the circumferential direction of the ring portion 2).

The cover portion 40 is made of a material having translucency, and in the case of the embodiment, specifically, is made of a transparent polycarbonate resin, an acrylic resin, or the like. The cover portion 40 has a substantially box shape (a substantially U-shaped cross section in the front-rear direction) with a lower side opened so as to cover a region of the light guide 32A from the upper face to the upper portion (see FIGS. 7 and 8). In the cover portion 40, an upper wall portion 41 covering the upper part of the light guide 32A is formed so as to be continuous with the outer peripheral face 23a of the peripheral wall portion 23 of the holding member 22 (that is, continuous from the outer peripheral face 13a of the covering layer 13) in the cross section of the ring portion 2. The upper wall portion 41 is formed to be slightly curved upward. That is, an outer peripheral face 41a of the upper wall portion 41 in the cover portion 40 is formed so as to be continuous from the outer peripheral face 23a of the peripheral wall portion 23 and the outer peripheral face 13a of the covering layer 13 in the cross section of the ring portion 2 (see FIGS. 7 and 8). In the steering wheel 1A, the outer peripheral face 23a of the peripheral wall portion 23 of the holding member 22A and the outer peripheral face 41a of the upper wall portion 41 of the cover portion 40 are in contact with the inner peripheral face 15 of the skin layer 14 (front portion 14a). In the cover portion 40, the side wall portion 42 extending downward from the front and rear ends of the upper wall portion 41 is interposed between the light guide 32A (specifically, the opening side portion 34A of the light guide 32A) and the support wall portion 24A of the holding member 22A. In the side wall portion 42, the locking hole 42a into which the locking claw portion 24a formed at the support wall portion 24A of the holding member 22A can be inserted and locked is formed at a portion disposed in front of the light guide 32A (see FIG. 8). Although not illustrated in detail, a plurality of locking holes 42a is provided corresponding to the locking claw portions 24a.

In the light guide 32A, the length dimension of an opening side portion 34A is slightly smaller than that of the light guide 32 described above. In addition, a light emitting face 37A of the light guide 32A is disposed below the upper wall portion 41 of the cover portion 40. The light guide 32A has the same configuration as the light guide 32 except for such a configuration.

In the steering wheel 1A having such a configuration, the number of parts is increased by providing the cover portion 40 as compared with the steering wheel 1 described above. However, the cover portion 40 can protect the light guide 32A. Further, also in the steering wheel 1A having such a configuration, the outer peripheral face of the cover portion 40 (the outer peripheral face 41a of the upper wall portion 41) and the outer peripheral face of the holding member 22A (the outer peripheral face 23a of the peripheral wall portion 23) are formed so as to be continuous from the outer peripheral face 13a of the covering layer 13. Therefore, even when an arrangement region of the light bar 20A, a boundary portion between the light bar 20A and the covering layer 13, and the like are touched by the driver's hand when the ring portion 2 is gripped, a smooth tactile sense can be obtained, and the tactile sense is good.

In the steering wheel 1, 1A of the embodiment, the skin layer 14 (front portion 14a) covering the outer periphery of the light bar 20, 20A is made of a base material that is opaque and has translucency. Therefore, light can also be diffused by the skin layer 14 itself, and when the steering wheel 1, 1A is viewed from above, the entire region of the light guide 32, 32A (the opening side portion 34, 34A) can be substantially uniformly illuminated while occurrence of unevenness is suppressed. Furthermore, in order to improve the light diffusion performance, the light diffusion layer is provided at the light emitting face of the light guide, and the light diffusion performance of the light guide can be improved. In addition, a light diffusion layer may be provided at an outer surface (upper face) or an inner face (lower face) of the upper wall portion of the cover portion. Furthermore, the cover portion itself may be made of a white turbid material having translucency instead of a transparent body. As described above, when the light diffusion layer is provided at the light emitting face of the light guide and the upper wall portion of the cover portion, or the cover portion itself is made of a white turbid translucent material, the light can be sufficiently diffused by the inside of the light guide or the cover portion even when the number of visible light LEDs having a large output is reduced. Therefore, when viewed from above, the occurrence of unevenness that causes a difference in brightness can be suppressed, and the entire arrangement region of the light guide can be uniformly illuminated. Of course, the arrangement of the light diffusion layer and the forming material of the cover portion can be appropriately changed.

In the steering wheel 1, 1A of the embodiment, the light bar 20, 20A is disposed in a partial region of the ring portion 2 (the upper face side of the front portion 2a). However, as a matter of course, the light bar may be disposed over the entire circumference of the ring portion. In addition, the arrangement position of the light bar is not limited to the front portion. The light bar may be disposed at another portion such as a rear region of the ring portion. Further, the steering wheel 1, 1A of the embodiment includes the annular ring portion 2 (grip portion). However, the steering device to which the present disclosure can be applied is not limited to the configuration including the annular ring portion. For example, the present disclosure is also applicable to a steering device of a type including a grip portion having an arc shape that is partially cut out, a square ring shape, or the like. In addition, the present disclosure is also applicable to a steering device of a type including a rod-shaped grip portion that is not annular but partially protrudes from the boss portion.

The present disclosure relates to a steering device having the following configuration.

A steering device includes a grip portion to be gripped at a time of rotational steering, and a display device, the display device being disposed at a predetermined position in the grip portion, the predetermined position being visually recognizable by a driver, the display device being capable of emitting visible light during an operation, the grip portion having y a substantially circular cross section includes a core material disposed at a center, a covering layer covering a periphery of the core material, and a sheet-like skin layer covering an outer periphery of the covering layer, wherein the display device is disposed in an upper face side region of the grip portion, the upper face side region being close to the driver, is configured to be able to emit the visible light upward, and is covered with the skin layer at an outer periphery together with the covering layer around the outer periphery, the skin layer is made of a base material that is opaque and has translucency.

In the steering device of the present disclosure, the display device is disposed in the upper face side region of the grip portion, the upper face side region being close to the driver, but the outer periphery of the display device together with the covering layer around the outer periphery is covered with the skin layer. That is, in the steering device of the present invention, the display device is not exposed to the outside, and the outer periphery of the grip portion is covered with the skin layer even in the arrangement region of the display device. Therefore, even when the arrangement region of the display device is gripped at the time of driving, only the skin layer touches the palm, and the tactile sense at the time of gripping the arrangement region of the display device is favorable. The skin layer is made of a base material that is opaque and has translucency. Therefore, when the display device is operated, visible light emitted upward can be transmitted, and the operating state of the display device can be stably visually recognized. Furthermore, when the display device is not in operation, the display device is invisible from the outside, and thus the design is also good.

Therefore, even when the steering device of the present disclosure is configured to illuminate a predetermined portion at the time of operation, it is possible to make a tactile sense at the time of gripping favorable and to steer comfortably.

Specifically, in the steering device of the present disclosure, the display device includes a substrate; a visible light source attached to the substrate and configured to emit visible light during lighting; a light guide that diffuses the visible light emitted from a visible light source; and a holding member that holds the light guide. In addition, the light guide includes, at the upper end that is close to the driver, a light emitting face that emits visible light emitted when the visible light source is turned on upward. The holding member is made of a non-translucent material, and is configured to cover the periphery of the light guide except for the light emitting face. The outer peripheral face of the holding member and the light emitting face of the light guide are formed so as to be continuous from the outer peripheral face of the covering layer in the cross section of the grip portion, and are configured to be in contact with the inner peripheral face of the skin layer.

That is, in the steering device of the present disclosure, the outer periphery of the display device is covered with the skin layer. Therefore, even when the light guide is included, the surface of the light guide need not be covered with a cover that has been conventionally used. Specifically, the outer periphery of the outer peripheral face of the holding member holding the light guide and the light emitting face constituted by the upper end side portion of the light guide may be directly covered with the skin layer. With such a configuration of the steering device, it is not necessary to dispose a cover that covers the light guide used in the conventional steering device, and it is possible to suppress an increase in the number of components and to provide a simple configuration. In addition, the light emitting face of the light guide and the outer peripheral face of the holding member are formed so as to be continuous from the outer peripheral face of the covering layer. Therefore, even when an arrangement region of the display device, a boundary portion between the display device and the covering layer, and the like touches the driver's hand at the time of gripping the grip portion, a smooth tactile sense can be obtained, and the tactile sense is favorable.

Further, as the steering device, in addition to the holding member, the display device may be provided with a cover portion that is made of a material having translucency and covers at least an upper portion of the light guide. With such a configuration, the outer peripheral face of the cover portion is formed so as to be continuous from the outer peripheral face of the covering layer together with t peripheral face of the holding member, and is configured to be in contact with the inner peripheral face of the skin layer. With such a configuration of the steering device, although the number of components is increased by providing the cover portion, the light guide can be protected by the cover portion. In addition, a diffusion layer or the like capable of diffusing visible light emitted from the light guide can be provided in the cover portion. Even in such configuration, the outer peripheral face of the cover portion and the outer peripheral face of the holding member are formed so as to be continuous from the outer peripheral face of the covering layer. Therefore, even when an arrangement region of the display device, a boundary portion between the display device and the covering layer, and the like touches the driver's hand at the time of gripping the grip portion, a smooth tactile sense can be obtained, and the tactile sense is favorable.

Furthermore, in the steering device having the above configuration, the light guide is preferably configured to have a substantially L-shaped cross-sectional shape such that the incident face on which the visible light emitted from the visible light source is incident is disposed at the lower end, and the region at the lower end protrudes toward the visible light source. With such a configuration, a long distance (optical path) from the incident face to the light emitting face of the light guide can be secured, and visible light can be more widely diffused in the light guide.

What is claimed is:

1. A steering device comprising:

a grip portion to be gripped at a time of rotational steering; and a display device, the display device being disposed at a predetermined position in the grip portion, the predetermined position being adapted so as to be visually recognizable by a driver, the display device being capable of emitting visible light during an operation, the grip portion having a substantially circular cross section includes a core material disposed at a center, a covering layer covering a periphery of the core material, and a skin layer covering an outer periphery of the covering layer, wherein the display device is disposed in an upper face side region of the grip portion, the upper face side region being disposed so as to face the driver, is configured to be able to emit the visible light upward, and is covered with the skin layer at an outer periphery together with the covering layer around the outer periphery, the skin layer is made of a base material that is opaque and has translucency, the display device includes a substrate; a visible light source that is attached to the substrate and emits visible light when turned on; a light guide that diffuses the visible light emitted from the visible light source; and a holding member that holds the light guide, wherein the light guide includes, at an upper end that is disposed so as to face the driver, a light emitting face that emits visible light emitted when the visible light source is turned on upward, the holding member is made of a non-translucent material, and is configured to cover a periphery of the light guide except for the light emitting face, and an outer peripheral face of the holding member and the light emitting face of the light guide are formed so as to be continuous from an outer peripheral face of the covering layer in a cross section of the grip portion, and are configured to be in contact with an inner peripheral face of the skin layer.

2. A steering device comprising:

a grip portion to be gripped at a time of rotational steering; and a display device, the display device being disposed at a predetermined position in the grip portion, the predetermined position being adapted so as to be visually recognizable by a driver, the display device being capable of emitting visible light during an operation, the grip portion having a substantially circular cross section includes a core material disposed at a center, a covering layer covering a periphery of the core material, and a skin layer covering an outer periphery of the covering layer, wherein the display device is disposed in an upper face side region of the grip portion, the upper face side region being disposed so as to face the driver, is configured to be able to emit the visible light upward, and is covered with the skin layer at an outer periphery together with the covering layer around the outer periphery, the skin layer is made of a base material that is opaque and has translucency, wherein the display device includes a substrate; a visible light source that is attached to the substrate and emits visible light when turned on; a light guide that diffuses the visible light emitted from the visible light source; a holding member that is made of a non-translucent material and holds the light guide; and a cover portion that is made of a material having translucency and covers at least an upper portion of the light guide, wherein an outer peripheral face of the holding member and an outer peripheral face of the cover portion are formed so as to be continuous from an outer peripheral face of the covering layer in a cross section of the grip portion, and are configured to be in contact with an inner peripheral face of the skin layer.

3. The steering device according to claim 1, wherein the light guide has an incident face on which the visible light emitted from the visible light source is incident, the light guide is configured such that the incident face is disposed at a lower end of the light guide, and a cross-sectional shape of the light guide is a substantially L shape so that a region at the lower end protrudes toward the visible light source.

4. The steering device according to claim 2, wherein the light guide has an incident face on which the visible light emitted from the visible light source is incident, the light guide is configured such that the incident face is disposed at a lower end of the light guide, and a cross-sectional shape of the light guide is a substantially L shape so that a region at the lower end protrudes toward the visible light source.

* * * * *